United States Patent
Garcia-Luna-Aceves et al.

(10) Patent No.: US 9,197,572 B2
(45) Date of Patent: Nov. 24, 2015

(54) THROUGHPUT ENABLED RATE ADAPTATION IN WIRELESS NETWORKS

(71) Applicant: The Regents of the University of California, Oakland, CA (US)

(72) Inventors: Jose Joaquin Garcia-Luna-Aceves, San Mateo, CA (US); Duy Nguyen, San Jose, CA (US)

(73) Assignee: The Regents of the University of California, Oakland, CA (US)

(*) Notice: Subject to any disclaimer, the term of this patent is extended or adjusted under 35 U.S.C. 154(b) by 77 days.

(21) Appl. No.: 14/211,960

(22) Filed: Mar. 14, 2014

(65) Prior Publication Data

US 2015/0271080 A1 Sep. 24, 2015

Related U.S. Application Data

(60) Provisional application No. 61/790,669, filed on Mar. 15, 2013.

(51) Int. Cl.
*H04L 12/825* (2013.01)
*H04W 28/02* (2009.01)

(52) U.S. Cl.
CPC ........... *H04L 47/25* (2013.01); *H04W 28/0231* (2013.01)

(58) Field of Classification Search
None
See application file for complete search history.

(56) References Cited

U.S. PATENT DOCUMENTS

| | | | | |
|---|---|---|---|---|
| 7,149,186 B1* | 12/2006 | Hey | ...................... | H04J 3/0626 370/232 |
| 7,167,502 B1* | 1/2007 | Tsaur | .................. | H04L 25/0262 370/320 |
| 7,599,394 B2* | 10/2009 | Hosein | ................ | H04W 52/267 370/235 |
| 7,966,419 B2* | 6/2011 | Mosko | ................ | H04L 47/2458 709/238 |
| 8,184,551 B2 | 5/2012 | Hu et al. | | |
| 8,345,551 B2* | 1/2013 | Wakuda et al. | ............... | 370/232 |
| 8,553,540 B2* | 10/2013 | Mehrotra | ................ | H04L 47/30 370/230 |
| 8,660,006 B2* | 2/2014 | Torres | ................. | H04L 41/5022 370/235 |
| 2003/0107988 A1* | 6/2003 | Lodha et al. | .................. | 370/229 |
| 2004/0259560 A1* | 12/2004 | Hosein | ................ | H04W 52/267 455/452.1 |
| 2005/0071876 A1* | 3/2005 | van Beek | ............. | H04N 19/159 725/62 |
| 2005/0169199 A1* | 8/2005 | Futenma | ........... | H04L 29/06027 370/282 |
| 2006/0251010 A1* | 11/2006 | Ramakrishnan | ...... | H04L 1/0009 370/328 |
| 2007/0115814 A1* | 5/2007 | Gerla | .................... | H04L 1/0002 370/230 |

(Continued)

OTHER PUBLICATIONS

Nguyen etal., "Multi-rate adaptation with interference and congestion awareness," 2011 IEEE 30th International Performance Computing and Communications Conference (IPCCC) Orlando, FL, Nov. 17-19, 2011.*

(Continued)

*Primary Examiner* — Ayaz Sheikh
*Assistant Examiner* — Faiyazkhan Ghafoerkhan
(74) *Attorney, Agent, or Firm* — Lumen Patent Firm

(57) ABSTRACT

Rate adaptation in a digital wireless communication network is performed by measuring by a wireless node data throughput values attained while communicating at different data rates on a channel in the network. The node calculates from the measured throughput alone a current transmission rate without any a priori knowledge of a state of the channel. The transmission rate calculation involves calculating a ratio of the measured throughput with respect to an exponential weighted moving average of the measured throughput. By repeating the measurements and calculations periodically, the rate used for transmission by the node is adapted automatically.

3 Claims, 2 Drawing Sheets

(56) References Cited

U.S. PATENT DOCUMENTS

| | | | | |
|---|---|---|---|---|
| 2008/0002573 A1* | 1/2008 | Mosko | H04L 47/2458 | 370/229 |
| 2008/0225737 A1* | 9/2008 | Gong | H04L 47/824 | 370/252 |
| 2009/0191817 A1* | 7/2009 | Gupta | H04W 28/24 | 455/67.13 |
| 2009/0191890 A1* | 7/2009 | Gupta | H04W 72/082 | 455/452.2 |
| 2010/0183087 A1* | 7/2010 | Hosokawa | H04B 7/0848 | 375/262 |
| 2010/0189063 A1* | 7/2010 | Kokku | H04L 47/10 | 370/329 |
| 2010/0217888 A1* | 8/2010 | Ukita | H04L 47/12 | 709/234 |
| 2010/0271947 A1* | 10/2010 | Abdelal | H04L 47/263 | 370/235 |
| 2011/0026401 A1* | 2/2011 | Wakuda et al. | | 370/235 |
| 2011/0216648 A1* | 9/2011 | Mehrotra | H04L 47/25 | 370/230 |
| 2011/0299422 A1* | 12/2011 | Kim | H04W 48/16 | 370/253 |
| 2013/0034014 A1* | 2/2013 | Jonsson | H04W 24/10 | 370/253 |
| 2013/0051380 A1* | 2/2013 | Lundgren | H04L 43/0829 | 370/338 |
| 2013/0135996 A1* | 5/2013 | Torres | H04L 41/5022 | 370/230 |
| 2014/0136653 A1* | 5/2014 | Luby | H04L 65/1083 | 709/217 |
| 2014/0269292 A1* | 9/2014 | Kalkunte | H04L 47/215 | 370/232 |

OTHER PUBLICATIONS

Acharya, Prashanth A., "Congestion-Aware Rate Adaptation in Wireless Networks: A Measurement-Driven Approach", Department of Computer Science, University of California, Intel Research, May 6, 2008.*

Starsky H.Y. Wong, "Robust Rate Adaptation for 802.11 Wireless Networks", Dept. of Computer Science, UCLA, 2006.*

Nguyen et al., "Multi-rate adaptation with interference and congestion awareness," 2011 IEEE 30th International Performance Computing and Communications Conference (IPCCC) Orlando, FL, Nov. 17-19, 2011.

* cited by examiner

Fig. 1

100
measuring by the node throughput attained while communicating at different data rates on a channel in the network

102
calculating by the node a current transmission rate from the measured throughput without any a priori knowledge of a state of the channel, by calculating a ratio of the measured throughput with respected to an exponential weighted moving average of the measured throughput.

104
transmitting by the node on the network at the calculated rate.

THROUGHPUT ENABLED RATE ADAPTATION IN WIRELESS NETWORKS

CROSS-REFERENCE TO RELATED APPLICATIONS

This application claims priority from U.S. Provisional Patent Application 61/790,669 filed Mar. 15, 2013, which is incorporated herein by reference.

STATEMENT OF GOVERNMENT SPONSORED SUPPORT

This invention was made with Government support under grant (or contract) no. W911NF-05-1-0246 awarded by the Army Research Office. The Government has certain rights in this invention.

FIELD OF THE INVENTION

The present invention relates generally to digital wireless communication techniques. More specifically, it relates to methods for rate adaptation (also known as rate control) in digital wireless networks, such as local area networks (LANs).

BACKGROUND OF THE INVENTION

The objective for rate adaptation in a wireless network is to assign the largest possible transmission rates to nodes in a way that multiple access interference (MAI) is minimized while the receiving nodes are still able to decode the transmitted packets under the current channel state. Rate adaptation constitutes a key aspect of the functionality of the IEEE 802.11 physical layer (PHY).

Designing a rate adaptation algorithm that performs well in diverse settings is challenging due to the complex physical-layer effects of wireless links, including interference, attenuation, and multi-path fading. While many solutions exist addressing the rate adaptation problem, the design of an efficient solution applicable to multiple diverse scenarios has proven to be elusive. This is due in part to the complex nature of a wireless channel and its interaction with the channel contention caused by users as they access the shared resource, plus the fact that network-level steps taken by nodes (e.g., attempting to use alternate routes around congestion hot spots) may induce additional interference by making more nodes relay packets.

MAI and natural phenomena associated to radio wave propagation are the key reasons for throughput reduction in wireless networks. Adapting to them is complicated by the unpredictability of interference. A network may be subject to little or a lot of interference, depending on the characteristics of the environment, the network density, and node movement, and environmental mobility. A major concern with MAI is that it increases very rapidly with node density and impacts the network layer, which causes MAI to spread over multiple hops as nodes attempt to route around congestion.

Rate adaptation schemes can be classified based on whether explicit or implicit feedback to the transmitters is used. Explicit feedback requires the receiver to explicitly communicate the channel condition on the receiver's side back to the sender. Implicit feedback looks at acknowledgment (ACK) packets or other channel information (i.e., received signal strength indicator (RSSI)) to infer the channel conditions on the receiver's side. We use the term rate control and rate adaptation interchangeably.

Explicit feedback approaches can be viewed as receiver-driven rate adaptation, because the receiver dictates the rate that should be used. The receiver obtains its current channel condition and relays this information back to the sender.

Receiver Based Auto-Rate (RBAR) selects the bit rate based on the S/N measurements. Upon processing a request to send (RTS) packet, the receiver calculates the highest bitrate and piggybacks this selected bit rate on the clear to send (CTS) packet. However, RBAR needs an accurate mapping between S/N values rates for different hardware.

Collision-Aware Rate Adaptation (CARA) combines the RTS/CTS packets for Clear Channel Assessment (CCA) functionality to differentiate frame collisions and frame failures. CARA requires too many control packets.

Effective SNR presents a delivery model by taking RF channel state as input and predicts packet delivery for the links based on the configuration of the Network Interface Controller (NIC). It takes advantage of the channel state information (CSI) either from feedback or estimated from the reverse path and computes its effective SNR by averaging the subcarrier BERs in order to find the corresponding SNR, where BER is a function of the symbol SNR and OFDM modulations. The drawback of using CSI is that SNR needs to be measured instantaneously, and feedback delay may not allow mode adaptation on an instantaneous basis. Because CSI itself is an approximation of the wireless channel, it may need to incorporate other information, such as higher-order statistics of SNR and Packet/Bit Error Rate or both for improving its accuracy and robustness.

In addition to incurring overhead by requiring the receiver to relay its channel state information back to the sender, an explicit approach may encounter the possibility of stale feedback due to the dynamic channel conditions during data transmissions. If the channel coherence time is very short, the receiver may not be able to relay accurate information to the sender. In the worst-case scenario, the receiver ends up sending feedback information to the sender continuously, which occupies the channel with feedback packets and prevents the sender from transmitting data. Although explicit feedback can work well if the channel conditions do not change rapidly, that is often not the case.

Implicit feedback approaches can be viewed as a sender-driven rate adaptation, given that the sender adapts its rate by inferring the channel conditions on the receiver side.

The Automatic Rate Fallback (ARF) scheme is one of the earliest rate control algorithms designed for WaveLAN-II. Upon encountering a second missed acknowledgement of data packets, then it falls back to a lower rate. A counter is used to track the number of good and bad acknowledgement packets for upgrading rates accordingly. However, the limitation of ARF is that it was designed for a few rates and does not work well with current IEEE 802.11 implementation.

Onoe is a credit-based rate control algorithms originally developed by Atheros. It extends ARF to current IEEE 802.11. However, its limitation is that the credit-based system tends to be too conservative and often gets stuck using lower rates.

The Adaptive Multi Rate Retry (AMRR) scheme introduces a Binary Exponential Back-off and adaptive threshold value depends on the feedback obtained from the number of attempted packets. The limitation of this approach is that binary exponential back-off tends to be too conservative in adapting rates.

The Sample rate control algorithm begins by sending the data at the highest bit rate. Upon encountering four successive failures, the scheme decreases the bitrate until it finds a usable bitrate. At every tenth data packet, the algorithm picks a random bitrate that may do better than the current one. MINSTREL, a widely deployed and popular Linux rate control, is an improved version of Sample, which takes into account the exponential weighted moving average statistics for sorting throughput rates. Unfortunately, MINSTREL still spends 10 percent of transmitted frames in trying random rates when its current rate is working perfectly.

Robust Rate Adaptation Algorithm (RRAA) uses short-term loss ratios to opportunistically adapt the rates. Like CARA, it employs an RTS filter to prevent collision losses from rate decreases. However, enabling RTS filtering upon encountering failed transmissions might not work as well as simply transmitting the data at lower rates. Besides, this adds an additional control overhead. Due to the nature of air interface, it is complex and difficult to predict the cause of the packet collisions.

Multi-Rate Adaptation with Interference and Congestion Awareness (MAICA) adapts the data rates used for transmission based on packet loss and a credit-based system. MAICA is inspired by the use of additive increase, multiplicative decrease policies AIMD congestion control mechanism and adopts it for the rate adaptation in wireless environment. The MAICA is limited by the need to tune several parameters used for its credit-based system, which reduces its ease of use and deployment.

SUMMARY OF THE INVENTION

The technique of the present invention, herein called Throughput Enabled Rate Adaptation (TERA), provides an approach to rate adaptation that accounts for interference and congestion effects implicitly but is based solely on measurements of the throughput attained at different data rates.

The use of throughput as the single parameter for rate adaptation in TERA leads to a solution that is surprisingly simple, robust, and efficient. A benefit of TERA is that it is based solely on throughput measurements that do not need any careful tuning of system parameters to work well.

TERA is compatible with existing 802.11 implementations. Extensive simulations and real-world experiments have shown that TERA consistently outperforms all prior rate adaptation schemes used to date.

The design of TERA is based on the insight that providing effective rate adaptation in a wireless network is related to the throughput experienced by nodes at different data rates. Furthermore, end-user applications care about the throughput attained, rather than the transmission rate used or the loss ratios.

In one embodiment, TERA is based on throughput measurements and its ratio with respect to exponential weighted moving average measurements. Specifically, it adjusts the transmission rate based on a periodic review of the performance of transmissions over a time window using an exponential weighted moving average window filter.

In one embodiment of TERA, the transmitter operates to simultaneously satisfy the following constraints: (a) increase its transmission rate immediately after detecting an increase in throughput, (b) avoid undesired fluctuations in data rates resulting from instantaneous measurements of throughput, (c) reduce its transmission rate quickly when the channel conditions are poor, and (d) operate without any a-priori knowledge of the state of the channel.

Key distinguishing features of embodiments of TERA include the following:

Rate adaptation does not rely on credit threshold, but its throughput is relative to the exponential weighted moving average (EWMA) throughput.

The ratio of throughput and its EWMA throughput is used for adapting rates.

Rate indices can be increased multiplicatively as well.

If the throughput oscillates, adjust the frequency of probing (i.e., make the probing period longer).

According to one aspect, the invention provides a method for rate adaptation implemented by a wireless node in a digital wireless communication network. The node measures throughput attained while communicating at different data rates on a channel in the network. It calculates from the measured throughput a current transmission rate without any a priori knowledge of a state of the channel. The calculation of the transmission rate is based on a calculation of a ratio of the measured throughput with respect to an exponential weighted moving average of the measured throughput. The current transmission rate may be calculated using no measurements other than the measured throughput. The current transmission rate is calculated such that a transmission rate increases as long as the measured throughput increases, the transmission rate decreases for deteriorating channel conditions, and drastic fluctuations in data rates resulting from instantaneous measurements of throughput are avoided. The node transmits on the network at the calculated rate. By repeating the measurements and calculations periodically, the rate used for transmission is adapted automatically. More specifically, the calculating the ratio of the measured throughput with respect to an exponential weighted moving average of the measured throughput may be performed at a polling frequency, and the polling frequency may be decreased if the measured throughput oscillates.

BRIEF DESCRIPTION OF THE DRAWINGS

FIG. 1 is a flowchart outlining a method of rate adaptation in wireless networks according to an embodiment of the invention.

DETAILED DESCRIPTION

Figure 2:
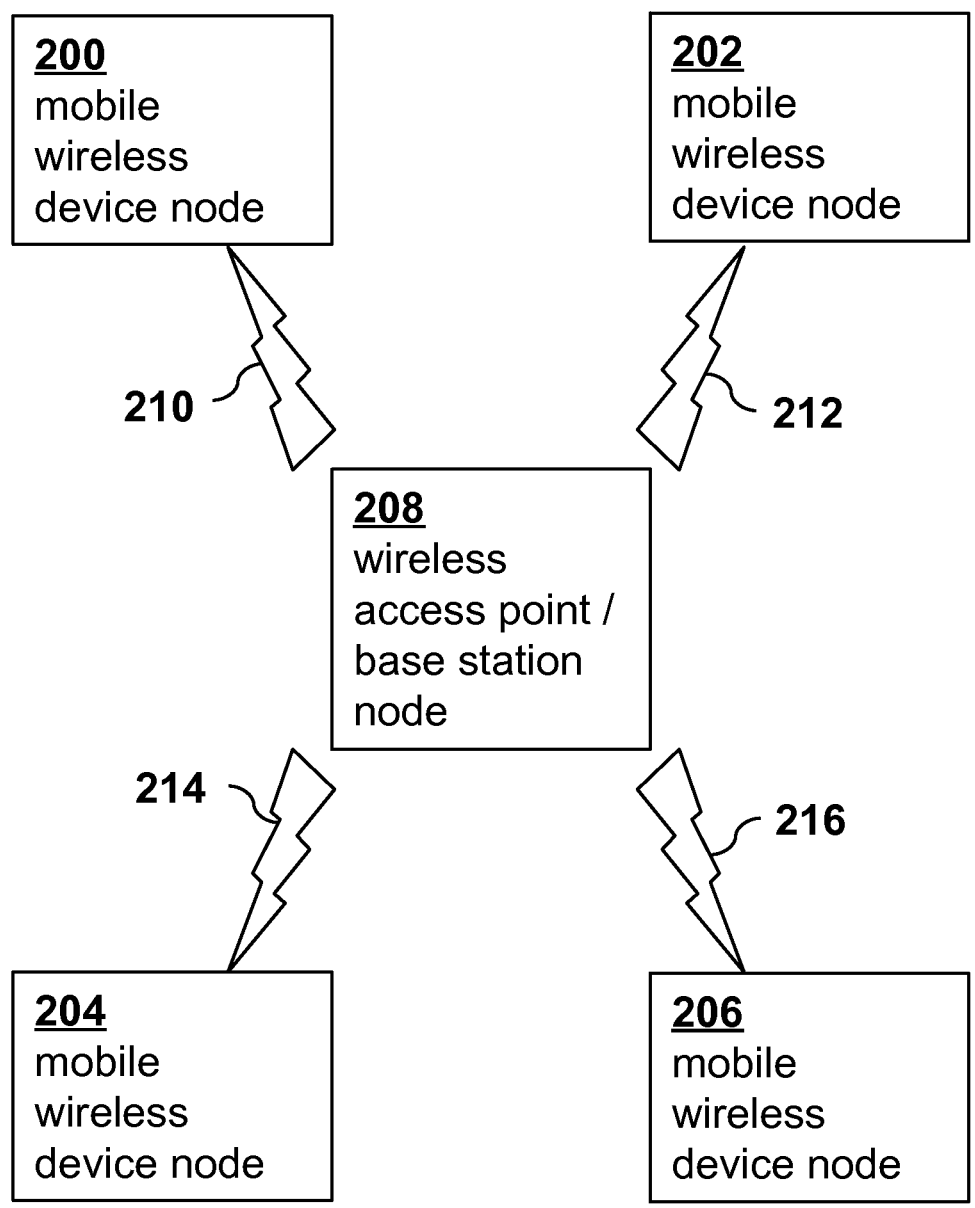
FIG. 2 is a schematic diagram of a wireless network in which a method of rate adaptation may be implemented according to an embodiment of the invention.

Embodiments of the present invention provide a Throughput-Enabled Rate Adaptation (TERA) technique that can operate solely on throughput monitoring at the transmitting node. Such a solution advantageously requires no configuration of performance parameters, and incorporates MAI and channel effects implicitly. The TERA technique (a) increases its transmission rate quickly as long as the perceived throughput increases, (b) avoids drastic fluctuations in data rates resulting from instantaneous measurements of throughput, (c) reduces its transmission rate quickly when the channel conditions are poor, and (d) operates without any a priori knowledge of the state of the channel.

FIG. 1 illustrates an outline of steps included in a method of rate adaptation by a wireless node in a wireless network according to an embodiment of the invention. The node can be a base station or wireless access point or a wireless client. In step 100 the wireless node measures throughput attained while communicating at multiple distinct data rates on a channel in the network. For example, throughput may be measured once every 900 ms second during non-probing phase and every 100 ms during probing phase. In step 102 the node calculates from the measured throughput a current transmission rate without any a priori knowledge of a state of the channel. Specifically, the calculation of the transmission rate is based on a calculation of a ratio of the measured throughput with respect to an exponential weighted moving average of the measured throughput. In step 104 the node transmits on the network at the calculated rate. This method of rate adaptation may be implemented by a node in a wireless network such as the network shown FIG. 2. The network is preferably a wireless LAN or mobile ad hoc network (MANET), but could also be a cellular data network or other wireless network. The network includes mobile wireless transceiver nodes 200, 202, 204, 206 communicating with a central wireless access point or base station 208 over respective wireless communication channels 210, 212, 214, 216.

For purposes of illustration, a specific implementation of the TERA method is provided below. These steps specify the way in which TERA attains rate adaptation based on throughput measurements. The use of throughput as the single parameter for rate adaptation in TERA leads to a solution that is surprisingly simple, robust, and efficient.

```
Definitions
    ω = time window
    idx = the rate index as shown in the Table of rate index.
    check(ω) = check whether time window ω is expiring
    Multiplicative = successive successful probes
    Oscillate = rates oscillate in a see-saw fashion state
    resetTimeInterval = for adjusting the frequency of probing
    Γ_prev = previous throughput
    prev_idx = previous rate index
while check(ω)
if Probing then
        if Γ < Γ' and idx != prev_idx then
            idx = prev_idx
            if Multiplicative then
                resetTimeInterval = 100ms
            else
                resetTimeInterval = 900ms
            end if
        else if Γ > Γ_prev and idx != prev_idx then
            resetTimeInterval = 100ms
        end if
        return
    end if
    if Δ ≥ 1 then
        // Multiplicative Increase
        if Multiplicative and !Oscillate then
            if idx + idx < max_idx then
                idx = idx + idx
            else
                idx = max_idx − 1
            end if
        // Additive Increase
        else if !Oscillate then
            if idx + 1 < max_idx then
                idx + +
            end if
        end if
        Probing= true
    else if Δ ≤ 0.90 and Δ ≥ 0.75 then
        // Additive Decrease
        if idx > 0 then
            idx − −
        end if
    else if Δ < 0.75 then
        // First occurrence: Additive Decrease
        if first and idx > 0 then
            idx − −
        // Successive occurrences: Multiplicative Decrease
        else if second and idx > 0 then
            idx ← idx * M_D
        end if
    end if
end while
```

The algorithm used in TERA for rate adaptation is based on the 802.11 rate index, which makes it compatible with 802.11 networks.

RATE INDEX AND DATA RATES CONVERSION TABLE

| Rate Index | IEEE 802.11a Data Rates (Mbps) | IEEE 802.11b Data Rates (Mbps) | IEEE 802.11g Data Rates (Mbps) |
|---|---|---|---|
| 0 | 6 | 1 | 1 |
| 1 | 9 | 2 | 2 |
| 2 | 12 | 5.5 | 6 |
| 3 | 18 | 11 | 9 |
| 4 | 24 | n/a | 12 |
| 5 | 36 | n/a | 18 |
| 6 | 48 | n/a | 24 |
| 7 | 54 | n/a | 36 |
| 8 | n/a | n/a | 48 |
| 9 | n/a | n/a | 54 |

Given that the available rates are constrained to the deterministic values of the transmission rate vector of rate index Table above, this involves selecting the index corresponding to the adequate rate value.

Although the technique here is described for the case of rate adaptation for Single Input Single Output (SISO) systems, the approach is easily adapted to IEEE 802.11n or other Multiple Input Multiple Output (MIMO) systems by including MIMO enhancements as known in the art.

The TERA technique adjusts the transmission rate based on a periodic review of the performance of transmissions over a time window ω. The rationale for using a time window is to ensure that calculated transmission rates do not fluctuate too much and that transitions between rates can proceed as seamlessly as possible. This is particularly important for such bandwidth sensitive applications as audio and video. In a preferred embodiment, ω=100 millisecond as an implementation guideline, because it provides sufficient information about the performance attained at given rates, and is also sufficient as a reactive time for adjusting rates. This time window can be adjusted as frequently as desired; however, adjusting the time window as frequently as 10 milliseconds may not be sufficient as the time window may be too short to gather enough data for processing.

We now describe mathematical details of the TERA technique. Let $x_i(t)$ be the rate index of the i-th user during time slot t. The throughput attained by a node ($\Gamma$) is calculated as in MINSTREL by taking into account the probability of success and the packet transmission time, i.e., $\Gamma = P*M/\tau$, where P=(number of successful packets)/attempts denotes the probability of successful transmission using rate index $x_i(t)$, M denotes the Megabits of data transmitted, and $\tau$ denotes the time for one try of one packet over the air using rate index $x_i(t)$.

To adjust rates, the ratio of the current throughput is monitored over the reference throughput, which is obtained by applying an exponential weighted moving average (EWMA) filter. This filter can be easily adjusted depending on how sensitive the reaction should be to the surrounding environment. Let $\Delta = \Gamma_t/\Gamma'_t$ be the ratio of the current throughput over the reference throughput with exponential weighted moving average (EWMA) at time t, where $\Gamma'_t$ is defined as $\Gamma'_t = \alpha*\Gamma_t + (1-\alpha)*\Gamma'_{t-1}$ for t>1 and $\Gamma'_t = \Gamma_t$ for t=1. The coefficient $\alpha$ represents a constant smoothing (or forgetting) factor between 0 and 1. A higher $\alpha$ value discounts older observations faster. We recommend a value of $\alpha$ between 0.75 and 0.95 to ensure sufficient reactiveness to changes in throughput and the surrounding environment.

During the transmission window, TERA keeps track of the packet successes as well as the number of attempts. These are used for calculating the probability of success needed to compute the attained throughput at time t ($\Gamma_t$). The EWMA filter is used on the current throughput to prevent TERA from being too sensitive to throughput fluctuations.

The initial step in the algorithm determines if the node is in the probing state. The Probing flag is used to signal that the protocol is in the probing state. The objective of having such a state is that, in some cases, increasing the transmission rate does not necessarily translate into a higher throughput. The transmission rate is increased only when the node is in the probing state, where the node searches to find the highest rate for the best throughput as quickly as possible with a combination of two probing frequencies.

To determine whether a higher rate produces a better throughput, the node keeps track of the last throughput $\Gamma_{t-1}$ it attained using the last rate index, so that the node can fall back to the best throughput. While the node is in probing state, the node sets the frequency of its probing rate to 100 ms if the throughput at the higher rate is larger than or equal to the reference throughput $\Gamma_r$. This allows the node to increase its rate quickly as long as the resulting throughput does not deteriorate. Conversely, if the probing of a higher data rate produces a deterioration in throughput, the frequency with which a new rate is probed is set at 900 ms. The rational for a 900 ms delay is to keep the probing window under 1 s, so that TERA can react to improving channel conditions resulting in better throughput without undue delays. When the current throughput is better than the reference throughput, TERA attempts to increase the rate either additively or multiplicatively. If the increased rate provides a better throughput, it is adopted and the algorithm exits the probing state.

To decrease the data rate, the node attempts to find a lower rate that provides better throughput and rely on its probing rate increase to bring it back to the highest transmission rate possible for the best throughput. After ensuring that TERA is not in a probing state for increasing rate, TERA checks the value of $\Delta$, which is the ratio of the current throughput over the reference EWMA throughput. If $\Delta$ is at least 1, this is an indication that the transmission rate is of good quality. Accordingly, if there is no oscillation in rate selections, then the rate is increased multiplicatively with successive successful probing increase: $x_i(t+1)=x_i(t)+x_i(t)$; otherwise, the rate is increased incrementally (i.e., $x_i(t+1)=x_i(t)+1$).

If $\Delta$ is between 0.90 and 0.75, then the quality of transmission rate is marginal, and the rate is decreased incrementally (i.e., $x_i(t+1)=x_i(t)-1$), so that the node may be able to find a better throughput by transmitting at lower rates.

If $\Delta$ is less than 0.75, then the transmission rate is of poor quality, and the rate is decreased incrementally with the first occurrence (i.e., $x_i(t+1)=x_i(t)-1$), and is decreased multiplicatively with each successive occurrence (i.e., $x_i(t+1)=M_D x_i(t)$, with $0<M_D<1$ a multiplicative factor). The preferred values for $M_D$ are selected such that that it is at least half of the current throughput index in order to for it to fall back quickly. The rationale for the initial incremental decrease of transmission rate is to probe the receiver at a slightly lower data rate. If that fails to improve throughput, it is a clear indication that the channel conditions are poor and that the data rate must be lowered drastically.

If $\Delta$ is between 1 and 0.90, the algorithm does nothing in order to account for the fact that the maximum throughput of the next lower rate is still lower than the current throughput.

The Multiplicative flag in the algorithm denotes that the node has experienced successive successful probes (e.g., two successive additively increases of the throughput). In this case, the algorithm enters the Multiplicative state, which allows the rate to be increased multiplicatively. The Oscillate flag in the algorithm is used to detect scenarios in which rate selection is alternating back and forth. The typical scenario is one in which the transmitter keeps trying to increase its rate, but fails to provide a better throughput doing so every time. When this happens, the frequency of probing is adjusted by resetting resetTimeInterval appropriately to every 100 ms or every 900 ms.

Note that multiplicative increases and decreases in data rate are used for TERA to respond quickly to drastic changes in channel conditions. Using only incremental changes to transmission rates would make the transmitter too slow in responding, given that there are 10 possible rates in IEEE 802.11g (as shown in the rate index Table) and rate adaptation must take place over a transmission window.

In simulations, the inventors compared the performance of TERA against several relevant rate adaptation schemes using NS-3. Unless otherwise specified, the following parameters are used in the simulations: a packet size of 512 bytes, a drop tail queue with a maximum length of 100, the IEEE 802.11a MAC model, a constant speed propagation model, a log distance propagation loss model ($L=L_0+10n \log_{10}(d/d_0)$), a transmission range of 150 m, interference range of 250 m, and UDP throughput. Each simulation was performed for 60 seconds; simulations lasting longer than 60 seconds produced similar results in benchmarking runs.

A first simulation considered the case of two nodes moving during data transmission. In this case, the source node moves at a speed of 1 m/s away from the target with no pause. The objective is to see how decreasing signal strength and fading affect performance. Similarly, it also considered the source node moving at a speed of 1 m/s towards the target with no pause. This simulation demonstrated that TERA performs better than any other known rate adaptation algorithm. Specifically, it demonstrated superior reactiveness with changing signal strength, and a smooth transition between rates due to its reactiveness.

In another simulation, nine sources are placed in a 10×10 grid topology and assigned 25 target nodes with the flows being exponentially distributed with mean of 3 seconds, for a total of 225 (25×9) distinct flows. A grid topology was selected to avoid dependence on any specific routing protocol, which could have influenced the results on rate adaptation.

Flows were exponentially distributed to ensure that this scenario did not favor any approach. Finally, there were 50 flows in a grid 10×10 topology where each node transmits to its immediate neighbor. The simulation compared MAICA and TERA in a 100-node, 10×10 grid topology with each node transmitting to each of its 8 immediate neighbors with exponentially distributed flows lasting an average of 3 seconds. In these scenarios, TERA performed as well as or better than MAICA without the complexities incurred in MAICA for the careful tuning of parameters. For the 10×10 grid scenario with exponentially distributed flows, AMRR, ARF, and Onoe do not perform well due to conservative approach with which they increase transmission rates. RRAA does not perform well because short-term loss ratio is unpredictable in this experiment. For the 50-flow scenario in which nodes are paired up with its immediate neighbors, progressive increase seems to outperform other aggressive probing protocols, as in ARF, CARA, and MINSTREL.

TERA has been implemented by the inventors in the Linux Kernel Wireless Stack to demonstrate that it can work correctly and independently of the Atheros chipset. TERA was compared against the default ATH5K Atheros chipset and a popular Linux rate control MINSTREL, given that these are available and widely deployed in many real-world settings.

In an experiment, a wireless access point was set up in a building and throughput was measured at different locations around the building. Experimental results of TERA were compared with two other widely popular and deployed linux rate adaptations. Nodes about 10 m from the access point (AP) are all able to obtain high throughput approximately 20 Mbps. The experiment was repeated on average of seven times. MINSTREL has a large standard deviation of throughput. At nodes 20 m away from the AP, ATH5K gets stuck in sub-optimal rates. At locations 40 m and 65 m away from the AP router, TERA was able to perform much better than ATH5K and MINSTREL.

The throughput-centric TERA technique thus provides superior performance based on implicit feedback. A key insight at the basis of TERA is that throughput can provide a great measurement tool for adapting rates robustly. TERA performs consistently better than many multi-rate adaptation schemes that are widely used and deployed today, especially in dense networks. Furthermore, TERA is surprisingly simple, practical, and is compatible with today's WiFi networks.

The invention claimed is:

1. A method for rate adaptation implemented by a wireless node in a digital wireless communication network, the method comprising:

measuring by the wireless node throughput attained while communicating at different data rates on a channel in the digital wireless communication network;

calculating by the wireless node from the measured throughput a current transmission rate without any a priori knowledge of a state of the channel;

transmitting by the wireless node on the digital wireless communication network at the calculated rate;

wherein calculating from the measured throughput a current transmission rate comprises calculating a ratio of the measured throughput with respect to an exponential weighted moving average of the measured throughput;

wherein calculating the ratio of the measured throughput with respect to an exponential weighted moving average of the measured throughput is performed at a polling frequency; and wherein the polling frequency is decreased if the measured throughput oscillates.

2. The method of claim 1 wherein calculating from the measured throughput the current transmission rate uses no measurements other than the measured throughput.

3. The method of claim 1 wherein the current transmission rate is calculated such that a transmission rate increases as long as the measured throughput increases, the transmission rate decreases for deteriorating channel conditions, and fluctuations in data rates resulting from instantaneous measurements of throughput are avoided.

* * * * *